United States Patent
Dalal (10) Patent No.: US 10,809,687 B2
(45) Date of Patent: Oct. 20, 2020

(54) FIELD DEVICE WITH SELF-RECOVERY

(71) Applicant: EMERSON PROCESS MANAGEMENT LLLP., Bloomington, MN (US)

(72) Inventor: Mehul Rajeshbai Dalal, Pimple Saudagar (IN)

(73) Assignee: EMERSON PROCESS MANAGEMENT LLLP., Bloomington, MN (US)

( * ) Notice: Subject to any disclaimer, the term of this patent is extended or adjusted under 35 U.S.C. 154(b) by 12 days.

(21) Appl. No.: 15/326,192

(22) PCT Filed: Sep. 30, 2014

(86) PCT No.: PCT/IN2014/000638
§ 371 (c)(1),
(2) Date: Jan. 13, 2017

(87) PCT Pub. No.: WO2016/051417
PCT Pub. Date: Apr. 7, 2016

(65) Prior Publication Data
US 2017/0205790 A1  Jul. 20, 2017

(51) Int. Cl.
*G05B 19/048* (2006.01)
*G05B 23/02* (2006.01)
(Continued)

(52) U.S. Cl.
CPC ....... *G05B 19/048* (2013.01); *G05B 19/4184* (2013.01); *G05B 23/0259* (2013.01);
(Continued)

(58) Field of Classification Search
CPC .............. G05B 19/048; G05B 19/4184; G05B 2219/24199; G05B 2219/25274; G05B 2219/24033
(Continued)

(56) References Cited

U.S. PATENT DOCUMENTS

| 7,233,879 B1 | 6/2007 | Chigusa |
| 2004/0167750 A1* | 8/2004 | Pagnano ............ G05B 23/0283 702/189 |

(Continued)

FOREIGN PATENT DOCUMENTS

| EP | 2665030 A1 | 11/2013 |
| IN | 3123/CHE/2014 | 6/2014 |

(Continued)

OTHER PUBLICATIONS

Stephen Mitschke "Fieldbus Diagnostics: Latest Advancements Optimize Plant Asset Management" retrieved from http://www.fieldbus.org/images/stories/enduserresources/technicalreferences/documents/wp-field-diagnostics-plant-asset-management.pdf on Jun. 19, 2017. 5 pages.

(Continued)

*Primary Examiner* — Jigneshkumar C Patel
(74) *Attorney, Agent, or Firm* — Christopher R. Christenson; Kelly, Holt & Christenson PLLC (57) ABSTRACT

A field device includes a controller and a process communication module. The controller is configured to perform at least one operation related to process control and is also configured to perform at least one self-recovery operation relative to the field device. The process communication module is coupled to the controller and is configured to couple to a process communication segment and communicate in accordance with a process communication protocol. The controller is configured to detect an erroneous condition and selectively apply the at least one self-recovery operation in response to the detected erroneous condition.

17 Claims, 5 Drawing Sheets

(51) Int. Cl.
*H04Q 9/00* (2006.01)
*G05B 19/418* (2006.01)
*H04L 1/00* (2006.01)

(52) U.S. Cl.
CPC ..... *H04Q 9/00* (2013.01); *G05B 2219/14054* (2013.01); *G05B 2219/24033* (2013.01); *G05B 2219/24054* (2013.01); *G05B 2219/24199* (2013.01); *G05B 2219/25274* (2013.01); *G05B 2219/31211* (2013.01); *G05B 2219/33062* (2013.01); *G05B 2219/33323* (2013.01); *G05B 2219/33327* (2013.01); *H04L 1/0061* (2013.01); *H04Q 2209/823* (2013.01); *Y02P 90/14* (2015.11)

(58) Field of Classification Search
USPC .......................................................... 700/81
See application file for complete search history.

(56) References Cited

U.S. PATENT DOCUMENTS

| | | | | |
|---|---|---|---|---|
| 2006/0259159 | A1* | 11/2006 | Zielinski | H04L 1/005 700/19 |
| 2008/0104442 | A1* | 5/2008 | Diao | G06F 9/4401 714/3 |
| 2009/0199044 | A1* | 8/2009 | Hurrell | G07F 9/02 714/23 |
| 2010/0305896 | A1* | 12/2010 | Chemisky | G01D 3/036 702/85 |
| 2012/0038458 | A1* | 2/2012 | Toepke | G05B 19/042 340/6.1 |
| 2012/0093242 | A1* | 4/2012 | Wallace | G05B 19/042 375/259 |
| 2013/0105322 | A1* | 5/2013 | Averbeck | C02F 1/008 204/554 |
| 2013/0327403 | A1* | 12/2013 | Jensen | F16K 31/12 137/1 |

FOREIGN PATENT DOCUMENTS

| | | | |
|---|---|---|---|
| JP | H1174170 | A | 3/1999 |
| JP | 2002290433 | A | 10/2002 |
| JP | 2003256027 | A * | 9/2003 |
| JP | 2004086706 | A | 3/2004 |
| JP | 2006059382 | A | 3/2006 |
| JP | 2006221308 | A | 8/2006 |
| JP | 2012032309 | A | 2/2012 |

OTHER PUBLICATIONS

Emerson Process Management, "475 Field Communicator", Product Data Sheet, May 2013, 7 pages.
First Office Action dated Mar. 6, 2018 for Japanese Patent Application No. 2017-517097, 13 pages including English translation.
Extended Search Report dated May 8, 2018, for European Patent Application No. 14903440.7, 7 pages.
Second Office Action dated Oct. 16, 2018 for Japanese Patent Application No. 2017-517097, 11 pages including English translation.
First Chinese Office Action dated Jun. 25, 2019 for Chinese Patent No. 201480065025.8, 15 pages including English translation.
Decision of Rejection for Japanese Patent Application No. 2016-517097 dated Sep. 10, 2019, 12 pages with English translation.
Second Office Action for Chinese Patent Application No. 201480065025.8 dated Nov. 29, 2019, 14 pages with English Translation.
Rejection Decision dated Apr. 24, 2020 for Chinese Patent No. 201480065025,8, 7 pages including English translation.

* cited by examiner

FIELD DEVICE WITH SELF-RECOVERY

CROSS-REFERENCE TO RELATED APPLICATION

This Application is a Section 371 National Stage Application of International Application No. PCT/IN2014/000638, filed Sep. 30, 2014 and published as WO 2016/051417 A1 on Apr. 7, 2016, the contents of which are hereby incorporated by reference in their entirety.

BACKGROUND

Process control systems, like those used in chemical, petroleum or other processes, typically include a centralized process controller communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controllers is typically made available to one or more applications executed by the operator workstation to enable an operator to perform any desired function with respect to the process, such as viewing the current state of the process, modifying the operation of the process, et cetera.

In the past, conventional field devices were used to send and receive analog (e.g., 4 to 20 mA) signals to and from the process controller via an analog bus or analog lines. These 4-20 mA signals were limited in nature in that they were indicative of measurements made by the device or control signals generated by the controller required to control the operation of the device. However, more recently, smart field devices (field devices containing a microprocessor or similar component) have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, et cetera. A number of standard and open communication protocols such as the Highway Addressable Remote Transducer (HART®), FOUNDATION™ Fieldbus, Profibus®, World FIP®, Device-Net®, and CAN protocols, have been developed to enable smart field devices made by different manufacturers to be used together within the same process control network.

An additional process communication protocol is the all-digital, two-wire bus protocol promulgated by the Fieldbus foundation known as the FOUNDATION™ Fieldbus (hereinafter "Fieldbus"). The Fieldbus protocol uses function blocks located in different field devices to perform control operations previously performed within a centralized controller. In particular, each Fieldbus field device is capable of including and executing one or more function blocks, each of which receives inputs from and/or provides outputs to other function blocks (either within the same field device or within different field devices), and performs some process control operation, such as measuring or detecting a process parameter, controlling a device or performing a control operation, such as implementing a proportional-integral-derivative (PID) control routine. The different function blocks within a process control system are configured to communicate with each other (e.g., over a bus) to form one or more process control loops.

With the advent of smart field devices, it is more important than ever to be able to quickly diagnose and correct problems that occur within a process control system, as the failure to detect and correct poorly performing loops and devices leads to sub-optimal performance of the process, which can be costly in terms of both the quality and the quantity of product being produced.

While the advances provided by smart field devices have significantly improved process control, when such field devices or process control loops or segments have errors or require repairs, reconfiguration, identifying the cause of the problem and solution thereto can be time-consuming. When a field device suffers and error condition, the process control operator often must dispatch a worker/technician to travel to the physical location of the field device, which may be located hundreds or even thousands of meters from the control location, and identify a suitable recovery method for the field device. In some instances, it may even be necessary for the process control operator to call the manufacturer of the field device in order to receive support for identifying a problem and/or implementing a suitable recovery method. Accordingly, a simple error condition occurring in a field device can still consume a significant amount of process control operator and/or technician time to remedy.

SUMMARY

A field device includes a controller and a process communication module. The controller is configured to perform at least one operation related to process control and is also configured to perform at least one self-recovery operation relative to the field device. The process communication module is coupled to the controller and is configured to couple to a process communication segment and communicate in accordance with a process communication protocol. The controller is configured to detect an erroneous condition and selectively apply the at least one self-recovery operation in response to the detected erroneous condition.

DETAILED DESCRIPTION OF ILLUSTRATIVE EMBODIMENTS

Figure 1:
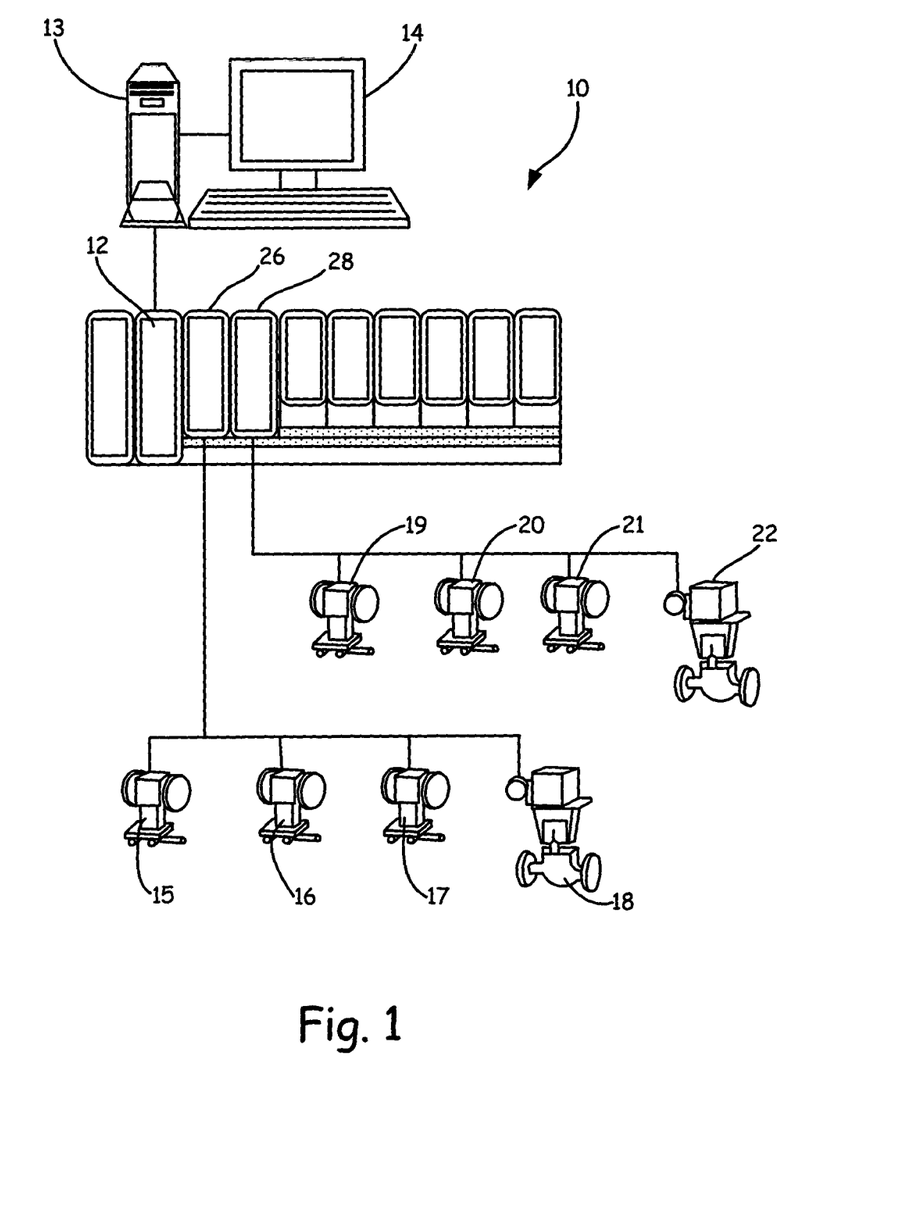
FIG. 1 is a diagrammatic view of a process control and monitoring system with which embodiments of the present invention are particularly applicable.

Referring now to FIG. 1, process control system 10 includes process controller 12 connected to host workstation or computer 13 (which may be any type of personal computer or workstation) having a display screen 14 and connected to field devices 15-22 via input/output (I/O) cards 26 and 28. The controller 12, which may be by way of example, the DeltaV™ controller offered by Emerson Process Management, is communicatively connected to host computer 13 via, for example, an Ethernet connection and is communicatively connected to the field devices 15-22 using any desired hardware and software associated with the Fieldbus protocol or any other suitable process communication protocol. Controller 12 implements or oversees a process control routine stored therein or otherwise associated therewith and communicates with the devices 15-22 and host computer 13 to control a process in any desired manner.

The field devices 15-22 may be any types of devices, such as sensors, valves, transmitters, positioners, etc. while the I/O cards 26 and 28 may be any types of I/O devices conforming to the Fieldbus protocol, or any other suitable process communication protocol. In the embodiment illustrated in FIG. 1, field devices 15-22 are smart field devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop or bus that interconnects field devices. The Fieldbus protocol provides, in effect, a local area network for field devices within a process, which enables these field devices to perform process control functions (using function blocks, such as PID, Control Selector, et cetera) at locations distributed throughout a process facility and to communicate with one another before and after the performance of these process control functions to implement an overall control strategy. The Fieldbus protocol is known in the art and is described in detail in numerous articles, brochures and specifications published, distributed, and available from, among others, the Fieldbus Foundation, a not-for-profit organization headquartered in Austin, Tex. As a result, most details of the Fieldbus communication protocol will not be described in detail herein.

Controller 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, et cetera control, or an output function which controls the operation of some device, such as a valve, to perform some physical function within the process control system 10. Of course, hybrid and other types of function blocks exist. Function blocks may be stored in and executed by the controller 12, which is typically the case when these function blocks are used for, or are associated with standard 4-20 mA devices and some types of smart field devices, or may be stored in and implemented by the field devices themselves, which is the case with Fieldbus devices. While the description of the control system is provided herein using function block control strategy, the control strategy could also be implemented or designed using other conventions, such as ladder logic.

A set forth above, when a smart field device malfunctions, even a simple error can take significant time to diagnose and correct. Such time is particularly valuable in terms of the labor cost for skilled technician time, as well as the system down time.

Figures 2A, 2B:
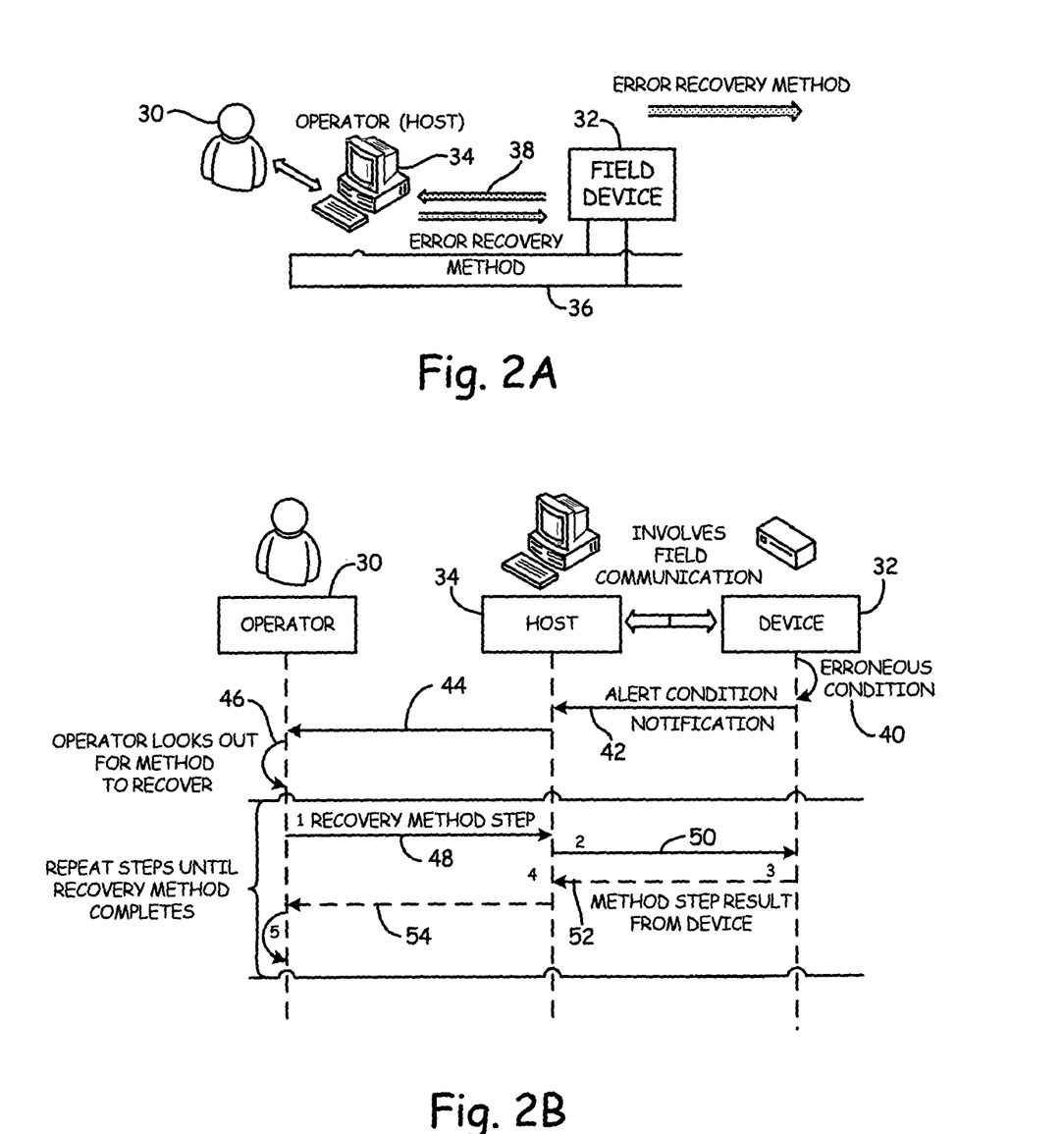
FIG. 2A is a diagrammatic view of a field device interacting with an operator through a host in order to perform a conventional error recovery method.
FIG. 2B is an activity diagram illustrating an operator interacting with a field device through a host in order to implement the error recovery method illustrated with respect to FIG. 2A.

FIG. 2A is a diagrammatic view of an operator 30 interacting with a field device 32 via host workstation 34. As illustrated in FIG. 2A, host workstation 34 and field device 32 are each communicatively coupled to process communication loop 36. Process communication loop 36 operates in accordance with a process communication protocol, such as Fieldbus, and is generally suited for operation in hazardous environments. However, the process communication loop or segment is also typically somewhat bandwidth limited in comparison to traditional data networks. When field device 32 has an error condition, the error is typically communicated through process control loop 36 to operator 30 via host workstation 34. It may take a number of back and forth communications between operator 30 and field device 32, as indicated at reference numeral 38 in order for operator 30 to obtain enough information about the error to select or otherwise obtain a suitable recovery method for the particular error condition. As set forth above, selecting and/or obtaining a recovery method may even require a call to the customer care number of the manufacturer of field device 32 in order to receive technical support. Once the recovery method is identified, operator 30 again works with field device 32 via host workstation 34 in order to implement the recovery method. In some cases, a manufacturing engineer must be present to debug a very cosmetic configuration issue.

The manual recovery process is illustrated diagrammatically in the activity diagram of FIG. 2B. Specifically, field device 32 initially identifies an erroneous condition 40 and provides an alert condition notification to host workstation 34, as illustrated at line 42. Host workstation 34 provides the alert condition notification to operator 30, as illustrated at line 44. Operator 30 must then determine a suitable method in order to recover from the erroneous condition, as illustrated by loop 46. As set forth above, this manual step may consume significant time of operator 30, as well as may require part or all of the process control system to be taken offline. Once a suitable recovery method is identified, operator 30 initiates a recovery method step via host workstation 34, as illustrated at line 48. Host workstation 34 then communicates via the process communication loop to field device 32 in order to implement the recovery method step, as illustrated at line 50. Once the recovery method step has been executed or otherwise implemented by field device 32, a result from such recovery step is provided back to host workstation 34, as illustrated at dashed line 52. Information indicative of the method step result is provided to operator 30 by host workstation 34, as illustrated at dashed line 54. The recovery method steps are repeated until the recovery method is complete. As can be appreciated, significant communication through the bandwidth-constrained process communication loop or segment is required in order to implement a suitable recovery method.

As shown in FIG. 2B, the operator has to intervene in order to resolve the erroneous condition in field device 32 in a manual procedure with significant process communication.

After field device 32 informs operator 30 about the erroneous condition, as illustrated at lines 42 and 44, the operator repeats recovery method steps 48, 50, 52 and 54 to resolve the condition.

Figure 3A:
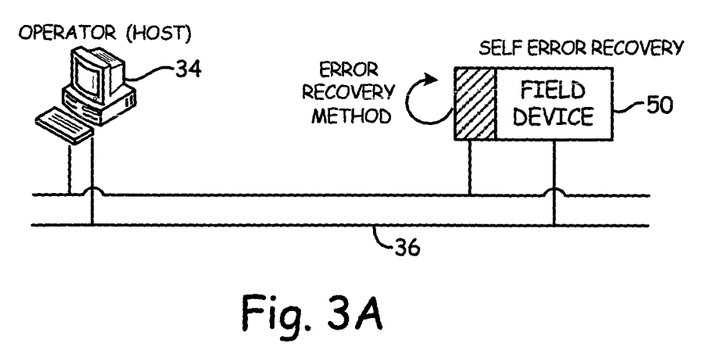
FIG. 3A is a diagrammatic view of an operator interacting with a field device executing a self-error recovery method in accordance with an embodiment of the present invention.
Figure 3B:
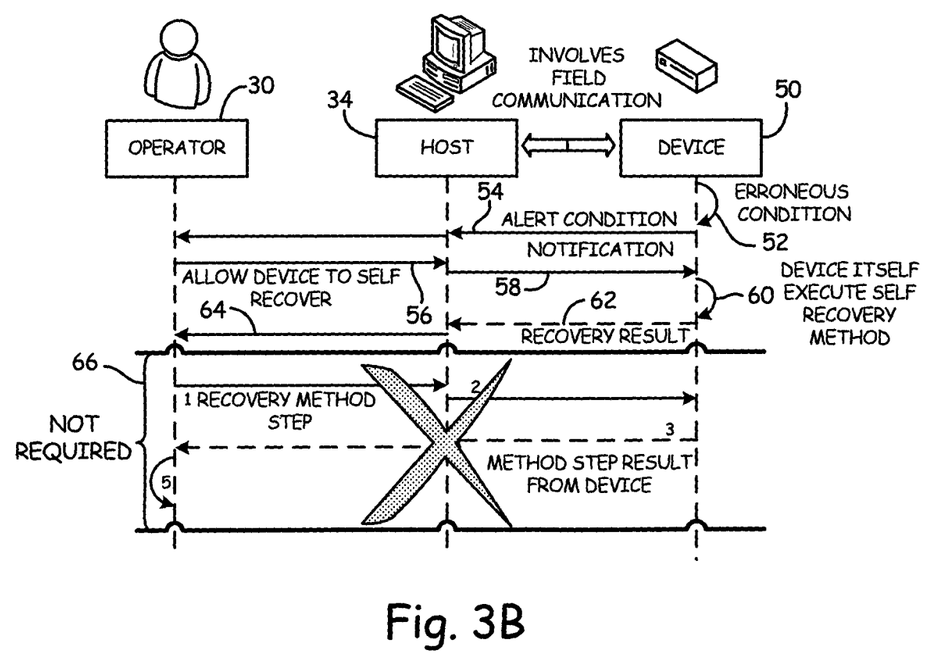
FIG. 3B is an activity diagram of an operator interacting with a field device executing the self-recovery method illustrated with respect to FIG. 3A, in accordance with an embodiment of the present invention.

FIG. 3A is a diagrammatic view of a field device executing a self-recovery method in accordance with an embodiment of the present invention. Field device 50 is communicatively coupled to host workstation 34 via process communication loop or segment 36. As shown in FIG. 3B, host workstation 34 communicates with operator 30. When field device 50 suffers an error condition, as illustrated at reference numeral 52, an alert condition notification is transmitted to host workstation 34, as illustrated at line 54. Alert condition notification 54 may be the same as alert condition notification 42 provided with respect to FIG. 2B. However, alert condition notification can also include information that indicates that field device 50 is configured to perform self-recovery relative to the alert. However, embodiments of the present invention can also be practiced where the alert condition notification simply contains the alert information. In such instances, host workstation 34 is aware of, or stores, information indicative of the ability of field device 50 to perform one or more self-recovery operations. Thus, when the alert condition notification 54 is received by host workstation 34, the communication sent to operator 30 is not necessarily indicative of the alert condition, but simply a request to authorize field device 50 to attempt self-recovery. Operator 30 can then determine whether to allow one or more self-recovery methods on field device 50. If the operator does not authorize the field device to self-recover, the self-recovery must be performed manually, as was done previously. However, if the operator does allow the field device to attempt self-recovery, as illustrated at line 56, host workstation 34 communicates such authorization to field device 50 via process communication, as illustrated at line 58. Once so authorized, field device 50 will attempt one or more self-recovery operations as illustrated at line 60. Once the one or more self-recovery operations have been completed, field device 50 reports a recovery result over the process communication loop to host workstation 34, as illustrated at line 62. Host workstation 34 then communicates the results to operator 30, as illustrated at line 64. Thus, the various interactions illustrated with respect to FIG. 2B, and shown, for reference, within bracket 66 are simply not required when the field device has the ability to self-recover. This saves significant operator time and effort, as well as reduces the amount of communication sent through the bandwidth-constrained process communication loop or segment. In some embodiments, the self-recovery operation(s) may be implemented as a function block in the field device. This is particularly so in embodiments where the field device communicates over a Fieldbus process communication segment or over a Profibus process communication segment.

Figure 4:
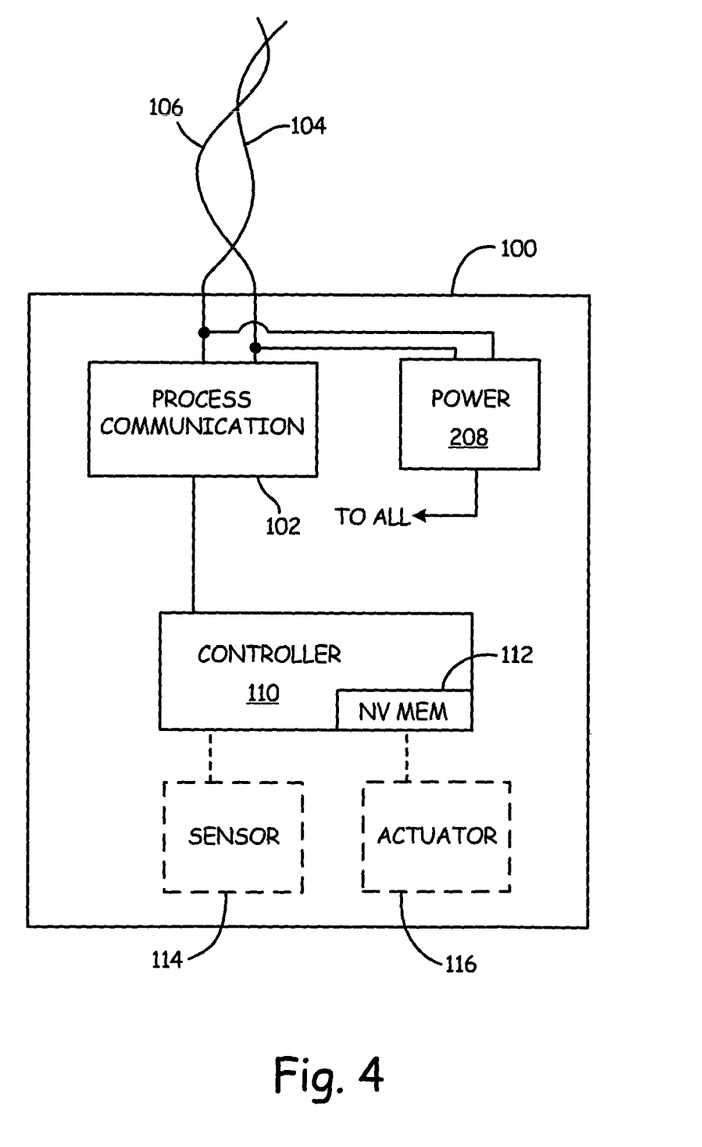
FIG. 4 is a block diagram of a field device having a controller configured to perform one or more self-recovery operations in accordance with an embodiment of the present invention.

FIG. 4 is a system block diagram of a field device in accordance with an embodiment of the present invention. Field device 100 may include a robust housing allowing field device 100 to be disposed outdoors and able to withstand climatological extremes of temperature, humidity, electromagnetic interference, et cetera. Field device 100 includes a process communication module 102 that provides field device 100 with the ability to communicate in accordance with a process communication protocol, such as those described above. In the embodiment illustrated in FIG. 4, process communication module 102 is configured to couple to a wired process communication loop via conductors 104, 106. In such an embodiment, power module 108 may also be couplable to conductors 104, 106 such that field device 100, by virtue of power module 108, may be able to operate solely on power received via the process communication loop. However, embodiments of the present invention also include wireless field devices which communicate via wireless process communication protocols, such as the WirelessHART® protocol (IEC62591). In such embodiment, power module 108 may include a battery and suitable conditioning circuitry for powering the components of field device 100.

Controller 110 is coupled to process communication module 102 and includes or is coupled to non-volatile memory 112. Non-volatile memory 112 stores one or more self-recovery routines that may be invoked or otherwise executed by controller 110 when a suitable error condition is detected and self-recovery is authorized. In some instances, one or more recovery operations may be stored directly in instructions stored within non-volatile memory 112 within or coupled to controller 110. However, recovery operations can also be stored in a device description for field devices 100. When an error condition arises, controller 110 will identify the error condition and communicate via process communication module 102 an alert relative to such error condition. If controller 110, via process communication module 102 or a local operator interface, receives an authorization to attempt self-recovery for the error condition, one or more self-recovery operations stored in non-volatile memory 112 are consulted and executed. Subsequently, controller 110 determines whether the self-recovery method or operation is successful in recovering from the error and provides an indication of the result via process communication module 102.

Field device 100 may be any suitable field device including, a process variable transmitter, which may include or be coupled to a sensor, illustrated in phantom at reference numeral 114. Alternatively or additionally, field device 100 may include or be coupled to one or more suitable actuators, as illustrated in phantom at reference numeral 116. Further still, field device 100 may simply provide a local indication of a process variable, such as a process variable display or diagnostic module. Accordingly, embodiments of the present invention are applicable to any field device that communicates over a process communication loop, and includes a controller, such as controller 110.

Figure 5:
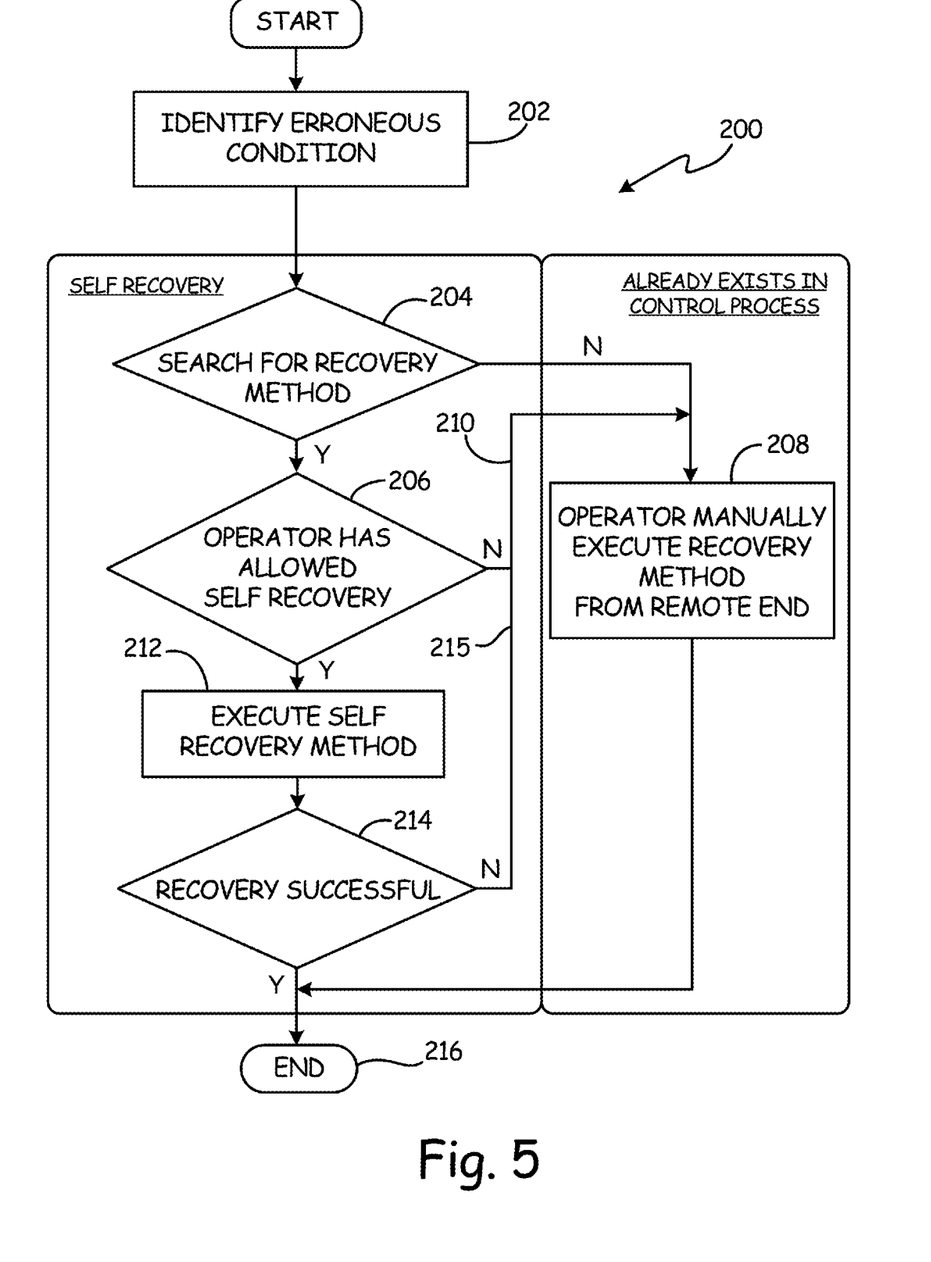
FIG. 5 is a flow diagram of a method for a field device to perform self-recovery in accordance with an embodiment of the present invention.

FIG. 5 is a flow diagram of a method self-recovery executing in a field device in accordance with an embodiment of the present invention. Method 200 begins at block 202 where the field device, such as field device 100, identifies an erroneous condition. Once this identification occurs, the field device determines whether self-recovery a self-recovery method is available that corresponds to the erroneous condition. If a self-recovery method is identified in non-volatile memory, such as non-volatile memory 112 of the field device, control passes to block 206. However, if block 204 determines that no recovery method is applicable for the error condition identified at block 202, then control passes to block 208 where an operator is alerted that manual recovery must be executed in accordance with prior techniques. Returning to block 204, if non-volatile memory 112 indicates that a suitable recovery method is available for the identified erroneous condition, then controller 110 generates a communication that process communication module 102 transmits via the process communication loop or segment to the operator to determine whether self-recovery is authorized by the operator. If the operator responds to the field device by indicating that self-recovery is not authorized, then control passes to block 208 via line 210 and recovery must be performed manually. However, if the operator does authorize self-recovery, control passes to block 212 where one or more self-recovery methods is/arc executed by controller 110 of the field device. In one embodiment, when the field device attempts to self-recover, it will go into an "out-of-service" or "maintenance" mode specifying that the field device is under maintenance. Additionally, the field device may need to restart itself during the recovery method, but will notify the operator via process communication before such restart. Next, at block 214 if the self-recovery recovery is not successful, then control passes to block 208 via line 215 where the operator must manually execute a recovery method. However, if the self-recovery is successful, then the successful recovery is reported to the operator via process communication and method 200 ends at block 216.

Allowing the field device to perform self-recovery can significantly reduce the effort required to address the erroneous condition of the field device and facilitate expeditious recovery. It is believed that while the methods described herein may increase complexity in the field devices, embodiments described herein will significantly reduce effort required from an operator to resolve erroneous conditions by almost 95%. While operator interaction and effort could be reduced further by not requiring specific authorization by the field device to perform one or more self-recovery operations, it is believed that such authorization is important in order to require the operator to identify the risk of self-recovery operations. However, embodiments of the present invention can be practiced in a fully-automatic scenario wherein the field device identifies an erroneous condition and automatically performs one or more self-recovery operations.

The self-recovery operations will, in some embodiments, be programmed into the field device during manufacture. In such instances, the manufacturer may be aware of specific instances where erroneous conditions may arise, and provide tailored solutions for each individual field device. However, it is also possible that even after a field device ships, the manufacturer may become aware of additional self-recovery operations that may be useful. In such instances, embodiments of the present invention include updating the non-volatile memory of the field device to include new or subsequent self-recovery operations that have been created or otherwise generated even after the sale or manufacture of the field device. Also, different manufacturer devices can have specific recovery methods which may or may not be compatible with other manufacturer recovery methods.

The following is an example of a self-recovery operation in accordance with an embodiment of the present invention. For example, there may be a situation in which an operator has misconfigured a field device and its scaling type. Moreover, the manufacturer of the field device may be already aware of similar errors while manufacturing the field device. This misconfiguration will make the field device generate an "out of service" mode. Due to this, the field device cannot operate in a "normal" mode during control loop/process operation. However, a self-recovery module in the field device can detect the reason of the field device operating in the "out of service" mode and can recover the field device from the misconfiguration by changing the units and scaling to desired, or manufactured, values.

The following is another example of a self-recovery operation in accordance with an embodiment of the present invention. Field devices generally store non-volatile data required in the process. In some instances, a checksum is implemented to verify the integrity of data stored in the non-volatile memory. This checksum is also stored in non-volatile memory for comparison with a calculated checksum. The field device will detect an error if the stored checksum and the calculated checksum do not match. Such a mismatch can have a number of different causes. For example, the stored data may have changed; the checksum calculation could have been performed incorrectly, the data could have changed without the stored checksum being updated, et cetera. In accordance with the self-recovery embodiments described herein, the field device can take one or more recovery actions. The field device may include a retry mechanism wherein the checksum is simply recalculated and verified against the stored checksum. If the checksum is calculated for a small block of data and stored, the field device can detect which block of non-volatile memory is corrupted. If this is possible, then the field device can resolve the non-volatile memory error by re-writing a default value in the non-volatile memory. Again, specific operator authorization for the self-recovery must be received, in one embodiment. This is important because the data being written may be very important to the process. Alternatively, the data in the non-volatile memory can be stored in an alternate location, thus allowing the non-volatile memory to have a secondary (backup) of the data. This backup can be implemented anytime data is updated in a primary portion of the non-volatile memory. When the field device detects a non-volatile memory error, the field device can switch over to the secondary memory. If none of the above operations are successful in resolving the erroneous condition, a notification can be sent to the operator through the host workstation, as set forth above.

Embodiments of the present invention are particularly useful for field devices that operate in accordance with process communication protocols that employ function blocks, such as the FOUNDATION™ Fieldbus protocol and Profibus protocol. However, embodiments of the present invention can be practiced with any field devices that employ a controller or microprocessor and include or are coupled to suitable non-volatile memory.

Although the present invention has been described with reference to preferred embodiments, workers skilled in the art will recognize that changes may be made in form and detail without departing from the spirit and scope of the invention.

What is claimed is:
1. A field device comprising:
a controller configured to perform at least one operation related to process control, the controller also being configured to selectively perform at least one self-recovery operation relative to the field device;
a process communication module coupled to the controller and configured to couple to a process communication segment and communicate in accordance with a process communication protocol;
wherein the controller is configured to generate a notification in response to a detected erroneous condition related to the field device, and wherein the notification includes a request to authorize self-recovery;
wherein the controller is configured to automatically perform the at least one self-recovery operation on the field device in response to a reply to the request; and
wherein the controller is configured to transmit an indication relative to whether the at least one self-recovery operation was successful and perform an operator determined recovery method if the at least one self-recovery operation was not successful.

2. The field device of claim 1, and further comprising non-volatile memory coupled to the controller and storing data defining the at least one self-recovery operation.

3. The field device of claim 2, wherein the data is stored in a device description of the field device.

4. The field device of claim 1, wherein the self-recovery operation is implemented as a function block in the field device.

5. The field device of claim 4, wherein the process communication module is configured to communicate in accordance with the Fieldbus process communication protocol.

6. The field device of claim 4, wherein the process communication module is configured to communicate in accordance with the Profibus process communication module.

7. The field device of claim 1, wherein the process communication module is configured to communicate in accordance with a wireless process communication protocol.

8. The field device of claim 1, wherein the controller is configured to transmit a result relative to whether the self-recovery operation was successful.

9. The field device of claim 1, wherein the field device is coupled to a sensor and provides an indication of a process variable over the process communication segment.

10. A method for operating a field device, the method comprising:
    detecting, in the field device, an erroneous condition;
    determining whether a self-recovery operation stored in the field device is applicable to the erroneous condition;
    transmitting an indication of the erroneous condition over a process communication segment and requesting authorization to apply the self-recovery operation;
    performing automatically the self-recovery operation if an authorization to apply the self-recovery operation is received by the field device;
    transmitting an indication relative to whether the self-recovery operation was successful; and
    manually performing an operator determined recovery method if the self-recovery operation was not successful.

11. The method of claim 10, and further comprising providing a result indication relative to whether the self-recovery operation was successful over a process communication segment.

12. The method of claim 10, and further comprising causing the field device to enter an out-of-service condition while the self-recovery operation is being applied.

13. The method of claim 10, and further comprising selectively causing the field device to restart after application of the self-recovery operation.

14. The method of claim 13, wherein selectively causing the field device to restart is performed is an authorization to restart is received by the field device.

15. The method of claim 10, wherein the method is embodied within a function block of the field device.

16. A method for operating a field device, the method comprising:
    detecting, in the field device, an erroneous condition;
    identifying a self-recovery operation stored in the field device applicable to the erroneous condition;
    transmitting an indication of the erroneous condition over a process communication segment and requesting authorization to apply the self-recovery operation;
    authorizing the field device to apply the self-recovery operation;
    performing automatically the self-recovery operation;
    transmitting an indication as to an unsuccessful outcome of the self-recovery operation;
    identifying manually a recovery method applicable to the erroneous condition; and
    performing manually the recovery method.

17. The method of claim 16 wherein performing automatically self-recovery operation comprises:
    generating an indication that the field device is in a maintenance mode.

* * * * *